Figure 1:
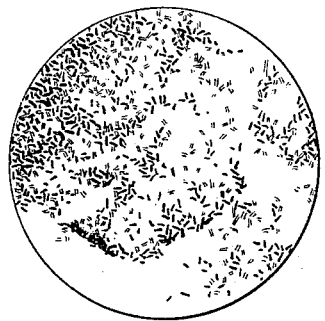

No. 638,828. Patented Dec. 12, 1899.
J. T. WOOD.
BATE.
(Application filed June 13, 1898.)
(No Model.)

Witnesses:
Jas. W. Graham
Bunyan Olive

Inventor:
Joseph T. Wood

UNITED STATES PATENT OFFICE.

JOSEPH T. WOOD, OF WEST BRIDGFORD, ENGLAND.

BATE.

SPECIFICATION forming part of Letters Patent No. 638,828, dated December 12, 1899.

Application filed June 13, 1898. Serial No. 683,356. (No specimens.)

*To all whom it may concern:*

Be it known that I, JOSEPH TURNEY WOOD, a subject of the Queen of Great Britain, and a resident of West Bridgford, in the county of Nottingham, England, have invented certain new and useful Improvements in Bates, of which the following is a specification.

This invention has reference to improvements in and relating to the means, liquid, or bate, used for the bating or puring of skins previous to the process of tanning the same.

At the present time skins are usually bated by means of a liquid or bate prepared from dog or pigeon dung, and although the bating action or actions have not hitherto been thoroughly understood it is a well-known fact that fermentations which the dung undergoes play an essential part. It was also pointed out by H. R. Proctor in 1885 in his *Text Book of Tanning* that the action of the bate was in a great measure due to bacteria. It is also a known fact to practical tanners that a dung bate properly applied produces the finest and most supple leather. Owing, however, to the varying compositions of the dung used, the bate made therefrom possesses varying properties, its bating action is uncertain, its properties are readily affected by atmospheric influences, and the skins treated are liable to putrefaction.

As a substitute for a dung bate it has been proposed, as set forth in the specification of the British Patent No. 21,720, A. D. 1895, and the specification of the German Patent No. 86,335, Class 28, to use a bate made from a pure culture of bacteria. Such bate, however, does not possess all the essential properties of a dung bate, and although bacterial action is necessary such action alone is not sufficient, as was pointed out by me in 1894 in the *Journal of the Society of Chemical Industry.*

I have now discovered that the bating action of a dung bate is due to the combined action of enzyms or unorganized ferments and certain chemical compounds, which compounds consist principally of amins—*i. e.,* ammonia in which one or more atoms of hydrogen has or have been replaced by alcohol radicals—in combination with organic acids usually found in dung, and of the compounds so formed the lactates and acetates are the most important. I have also discovered that the bating action of the enzyms alone or the action of the above-referred-to chemical compounds alone is inefficient and that the enzyms exert their bating action in the presence of the chemical compounds, while these latter, in addition, have an independent action on the lines in the skins and on the skin fiber.

The object of this invention is the production according to scientific methods of a bate having similar properties to those of a dung bate, such properties in the improved bate being modified according to the requirements of the skins to be bated and the leather to be produced.

According to this invention the liquid or bate is made by producing by fermentation an enzym or enzyms of the same character as the enzyms contained in dog-dung or produced from bacteria contained in the dung, and to the liquid thus obtained there is added an organic acid and an alkali.

I have discovered that for an efficient bate a pure culture or single species of bacteria is insufficient and that no single organism hitherto isolated will give results equal to dung. I have also discovered that the production of enzyms of the character above referred to depends more upon the composition of the nutrient medium in which the bacteria are cultivated than upon the kind of bacteria, although these latter must be capable of producing the required enzyms, the production of which appears to be due to a synibeotic growth of bacteria at present little understood. The bacteria used for the purpose of this invention may be the bacteria found in dog-dung or the bacteria obtained from the roots of the hairs of skins during the sweating process, these latter being used, by preference, on account of the ease with which they are obtained, compared with the difficulty of isolating from the dog-dung the particular mixture of species most desirable, there being so many undesirable species present. Of the bacteria found on the roots of the hair during the sweating process and hereinafter referred to as "sweating" bacteria I have found that two species predominate, and so far as I am aware these have not been previously isolated. The principal organism, which I call "bacillus *d,*" in continuation of a series of previous investigations described in the *Journal of the Society of Chemical Industry*, A. D. 1898, forms large whitish colonies with irregular contour spreading on the surface of the gelatin, the bacilli being very small, mostly occurring in pairs, but sometimes joined together in thread-like forms. The second organism, called by me "bacillus e," forms small brownish-yellow boat-shaped colonies on gelatin plates. The bacteria consist of plump cells two or three times the size of bacillus d, united in pairs and chains, but the cells vary considerably in size and are surrounded by a capsule. I have discovered that the above bacteria when used separately as pure cultures exert little or no action on the skin, but when used together the action is very remarkable.

The gelatin and gelatin plates referred to in the above description are the gelatin and gelatin plates used for the cultivation of bacteria according to the ordinary bacteriological methods as described in Gunther's *Bacteriologie*, published by George Thieme, Liepsic, in 1898, and in other text-books.

Figure 2:
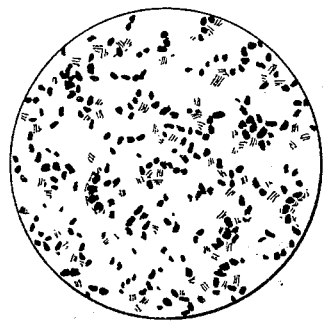

In the accompanying drawings, made from photographs which are of record in this case, the bacillus d is shown in Figure 1, and the bacillus e in Fig. 2, both photographs showing the bacilli magnified one thousand diameters.

A culture may be prepared from the sweating bacteria by taking the hair from the skin when it "slips"—that is, when it can be removed by simply pulling it. The root portion of the hairs are then cut off and about ten grams carefully digested in one hundred cubic centimeters of water at a temperature of 32° to 35° centigrade for several hours. The liquid portion is then poured off and used for inoculating ten thousand cubic centimeters of a nutrient medium of the character hereinafter described. The inoculated nutrient medium is then maintained for three days at a temperature of 37° centigrade, and may then be used for the inoculation of a larger quantity of nutrient medium.

Theoretically a single cell of a bacterium is sufficient to inoculate any quantity of any suitable fluid; but in practice it is found necessary or expedient to employ five or ten per cent. of inoculating matter to the volume of the liquid to be inoculated. The inoculation of the ten thousand cubic centimeters of nutrient medium may be done in a Carsberg vessel, as described by Hansen in his *Untersuchungen aus der Praxis der Gärungsindustrie*.

It is desirable that the nutrient medium should be without sugars or carbohydrates, and although its composition may be varied good results can be obtained by ordinary bacteriological methods by using a medium composed of gelatin, fifty parts or twenty grams; potassium or sodium phosphate, one part or 0.4 gram; sodium chlorid, one part or 0.4 gram; water, two thousand five hundred parts or one thousand cubic centimeters. This medium after inoculation is maintained at a temperature of 37° centigrade until the required bacterial action is completed—i. e., until the whole of the nutriment for the bacteria is exhausted, at which time the maximum quantity of the required enzyms have been produced. The time required for this action is not less than three days or more than seven days. The exhaustion of the nutriment may be ascertained scientifically by a microscopic examination of the liquid, the bacilli at this period commencing to form spores. To each liter of this liquid there is then added from two to six grams of lactic acid and the acid liquid is afterward neutralized by ammonia, which is added when the liquid is to be used as a bate, the addition of the ammonia forming certain chemical compounds similar to those found in the dung. Instead of lactic acid acetic or other similar organic acid may be used, but sulfuric or mineral acids must not be used. The addition of the acid to the liquid will immediately stop the growth of the bacteria, but the acid is not added for that particular purpose, but for the formation of the chemical compounds above referred to.

The above-described method is most suitable when the bate has to be kept for a time before being used or when it is desired to concentrate it for transit or export, but if the bate is to be used immediately it may be prepared as follows: One hundred parts of gelatin are dissolved in one thousand parts of water, and there is then added fifty parts of commercial lactic acid. The mixture is then heated in a closed vessel to 100° centigrade, by which operation the gelatin is partially peptonized and the subsequent bacterial action is hastened. The acid liquid is afterward neutralized with ammonia or other alkali and the whole diluted with water to twenty thousand parts. The dilution may conveniently take place in the wheel or paddle in which the bating is to be done, and to the liquid thus obtained there is added from five to ten per cent. of the active culture from the Carlsberg vessel, as above described. The liquid is then allowed to stand for fifteen to twenty hours at a temperature of 37° centigrade and is then ready for use.

For bating skins in a practical manner with the improved bate herein set forth the method of using the same is varied according to the skins to be treated and the kind of leather it is required to produce, and the strength of the bate is varied in exactly the same manner as the strength of a dung bate, and such variation is made according to the judgment of the tanner, the improved bate acting in the same manner as a dung bate.

For kid-skins, calfskins, skivers, and other skins for which dog-dung has hitherto been used the skins after the liming process are first well washed in water in the usual way to remove the bulk of the lime. The skins are then placed in a wheel or paddle with the bate prepared, as above described, with the acid exactly neutralized or so nearly neutralized that the alkaline action of the skins will complete the neutralization, all skins being alkaline when introduced into the bate. The bate is maintained at a temperature of 37° centigrade, and the skins are kept in motion until they have "fallen" considerably—i. e., until the swollen condition of the fibers due to the liming has disappeared. The skins are then removed from the wheel or paddle and scudded by hand or machine, preferably on the grain side, and the skins not sufficiently reduced are returned to the paddle and the bating continued until the action is completed, this being judged in the usual way by the tanner by the feel of the skins. The strength of the bate when skins are returned thereto may be varied from the original strength, if desired, and after the bating is completed the skins are treated in the usual manner.

The strength of the bate into which the skins are placed is varied according to the amount of liming the skins have undergone—that is to say, for a high-limed skin a strong bate is required. For moderately-limed skins the bate may be of such a strength that each liter as prepared for use contains five grams of the original gelatin contained in the nutrient medium, which is equal to one part of liquid in which the culture has taken place to three parts of water. When the bate is prepared for immediate use, its strength is varied in the paddle as required. For very hard skins, such as goatskins, the culture may be used as a bate undiluted or it may be diluted with an equal quantity of water.

For light-dressing hides and similar skins, which have hitherto been treated with pigeon-dung, the skins are washed in the usual manner after the liming process, heated to 37° centigrade, and placed in a wheel or paddle containing the improved bate, preferably in an acid condition—that is, before the ammonia or alkali has been added—the strength of the bate being equivalent to five grams of original gelatin contained in the nutrient medium to each liter of the bate used. When the lime has been removed from the skins by the bate, which will be in about one hour, a quantity of the original culture previously neutralized with ammonia or other alkali and equal to about one-half of the quantity of the original culture first added is placed in the wheel and the bating continued until the process is completed, this being judged by the feel of the skins. If in the above method the chemical reaction of the bate be examined before the second portion of culture be added, it will be found neutral, and the action of the enzyms takes place in a neutral or alkaline solution, as in the first-described method.

The character of the principal enzym in dung and in the improved bate is a proteolytic one—i. e., it resembles the trypsin contained in pancreatic juice.

Instead of adding an organic acid and neutralizing it by an alkali, as described with reference to both processes, there may be added an organic salt of the same character as that formed by the combination of the acid and the alkali.

What I claim, and desire to secure by Letters Patent of the United States, is—

1. A bating liquor or bate containing enzyms of the same character as the enzyms contained in dog-dung, an organic acid, and an alkali, or their chemical equivalent i. e. an organic salt substantially as herein set forth.

2. A bating liquor or bate containing enzyms of the same character as the enzyms contained in dog-dung and produced by fermentation an organic acid and an alkali, or their chemical equivalent substantially as herein set forth.

3. A bating liquor or bate containing one or more enzyms of the character of the enzyms contained in dog-dung an organic acid and an alkali, or their chemical equivalent substantially as herein set forth.

4. A bating liquor or bate containing one or more enzyms of the character of the enzyms contained in dog-dung, or produced from bacteria obtained from dog-dung, an organic acid, and an alkali or their chemical equivalent substantially as herein set forth.

5. A bating liquor or bate containing enzyms of the same character as the enzyms contained in dog-dung, two to six grams of an organic acid to each liter of the liquid and neutralized by an alkali substantially as herein described.

6. A bating liquor or bate containing enzyms of the same character as the enzyms contained in dog-dung, from two to six grams of lactic acid to each liter of liquor and neutralized by ammonia substantially as herein described.

7. A bating liquor or bate containing enzyms of the same character as the enzyms contained in dog-dung and obtained from bacteria found on the roots of hairs during the sweating process, from two to six grams of lactic acid, and neutralized by ammonia substantially as herein set forth.

8. A bating liquor or bate containing enzyms produced from bacteria obtained from dog-dung and cultivated in a medium composed of fifty parts of gelatin, one part of potassium or sodium phosphate, one part of sodium chlorid and two thousand five hundred parts of water, two to six grams of lactic acid to each liter of liquor and neutralized by the addition of ammonia substantially as herein described.

JOSEPH T. WOOD.

Witnesses:
JAS. A. WHATNALL,
WILLIAM H. POTTER.